United States Patent [19]

Zolnowsky et al.

[11] Patent Number: 4,584,666
[45] Date of Patent: Apr. 22, 1986

[54] METHOD AND APPARATUS FOR SIGNED AND UNSIGNED BOUNDS CHECK

[75] Inventors: John Zolnowsky, Menlo Park, Calif.; Edward J. Rupp; Douglas B. MacGregor, both of Austin, Tex.

[73] Assignee: Motorola, Inc., Schaumburg, Ill.

[21] Appl. No.: 623,043

[22] Filed: Jun. 21, 1984

[51] Int. Cl.[4] .............................................. G06F 7/38
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 4,087,856 | 5/1978 | Attanasio | 364/200 |
| 4,099,242 | 7/1978 | Houston et al. | 364/200 |
| 4,151,593 | 4/1979 | Jenkins et al. | 364/200 |
| 4,184,201 | 1/1980 | Melberg et al. | 364/200 |

Primary Examiner—Thomas M. Heckler
Attorney, Agent, or Firm—Anthony J. Sarli, Jr.; Jeffrey V. Myers; James L. Clingan, Jr.

[57] ABSTRACT

A typical feature of a data processor is a bounds check. A bounds check is achieved when a determination is made as to whether a check value, typically an address or datum, is within predetermined bounds. Such check values may be signed or unsigned. By requiring that the upper bound be numerically larger than the lower bound for doing a signed check, and requiring that the upper bound be logically larger than the lower bound for doing an unsigned check, the bounds check is performed by the data processor without the need of receiving a signal which informs the data processor in advance as to whether the check is to be signed or unsigned.

5 Claims, 9 Drawing Figures

METHOD AND APPARATUS FOR SIGNED AND UNSIGNED BOUNDS CHECK

FIELD OF THE INVENTION

The subject invention relates to bounds checks, and more particularly, to signed and unsigned bounds checks in a microcomputer.

BACKGROUND OF THE INVENTION

In a computer or microcomputer an operand, such as an address or datum, may be signed or unsigned. A signed number is typically understood to be one in which the bit which would ordinarily be the most significant bit (MSB) is used to indicate if the number is positive or negative. A one indicates the number is negative and a zero indicates that the number is positive. A signed number is a number which can be described as having a numeric value which can be either positive or negative. An unsigned number is one in which the MSB is in fact used for the purpose of being the most significant bit. An unsigned number is always thought of as being positive. An unsigned number is described as having a logic value. If asked the numeric value of a binary number of ones and zeros, the answer will assume that the bit in the MSB location determines the sign. If, on the other hand, asked the logic value of a binary number, the answer will include the MSB in determining the magnitude.

In a microcomputer, operands typically share the same bus. Operands, as stated previously, may be signed or unsigned. An instruction which the microcomputer is typically expected to perform is a determination as to whether or not an operand or address is within bounds. Because the bus will have both signed and unsigned numbers, the microcomputer must be able to do a boundary check on both signed and unsigned numbers. Because the MSB may indicate either sign or magnitude, a boundary with an MSB of one may be either positive or negative. Consequently, a boundary check has always also required information as to whether the number to be checked was signed or unsigned.

The additional requirement of indicating whether the number to be boundary checked is signed or unsigned, increases program complexity.

SUMMARY OF THE INVENTION

An object of the present invention is to provide an improved signed and unsigned boundary check.

Another object of the present invention is provide a boundary check which reduces program complexity.

Yet another object of the invention is to provide a boundary check with improved flexibility.

These and other objects of the invention are achieved in a data processor which stores an upper and a lower bound for determining if a check value, which may be signed or unsigned, is within the upper and lower bounds. A within-bounds signal is provided if certain conditions are met. If any of the following conditions are met, the within-bounds signal is generated. The lower bound equals the ckeck value. The lower bound is numerically less than the check value, and the upper bound is numerically greater than or equal to the check value. The lower bound is numerically less than the check value, the upper bound is not numerically greater than the check value, and the upper bound is numerically less than the lower bound. The upper bound is equal to the check value. The lower bound is not numerically less than the check value, the upper bound is not numerically less than the check value, and the upper bound is not numerically greater than or equal to the lower bound. An out-of bounds signal is provided if none of the foregoing conditions are met. Consequently the within-bounds signal is generated if the check value is in bounds, whereas the out-of-bounds signal is generated if the check value is out of bounds.

DESCRIPTION OF THE INVENTION

Figure 1:
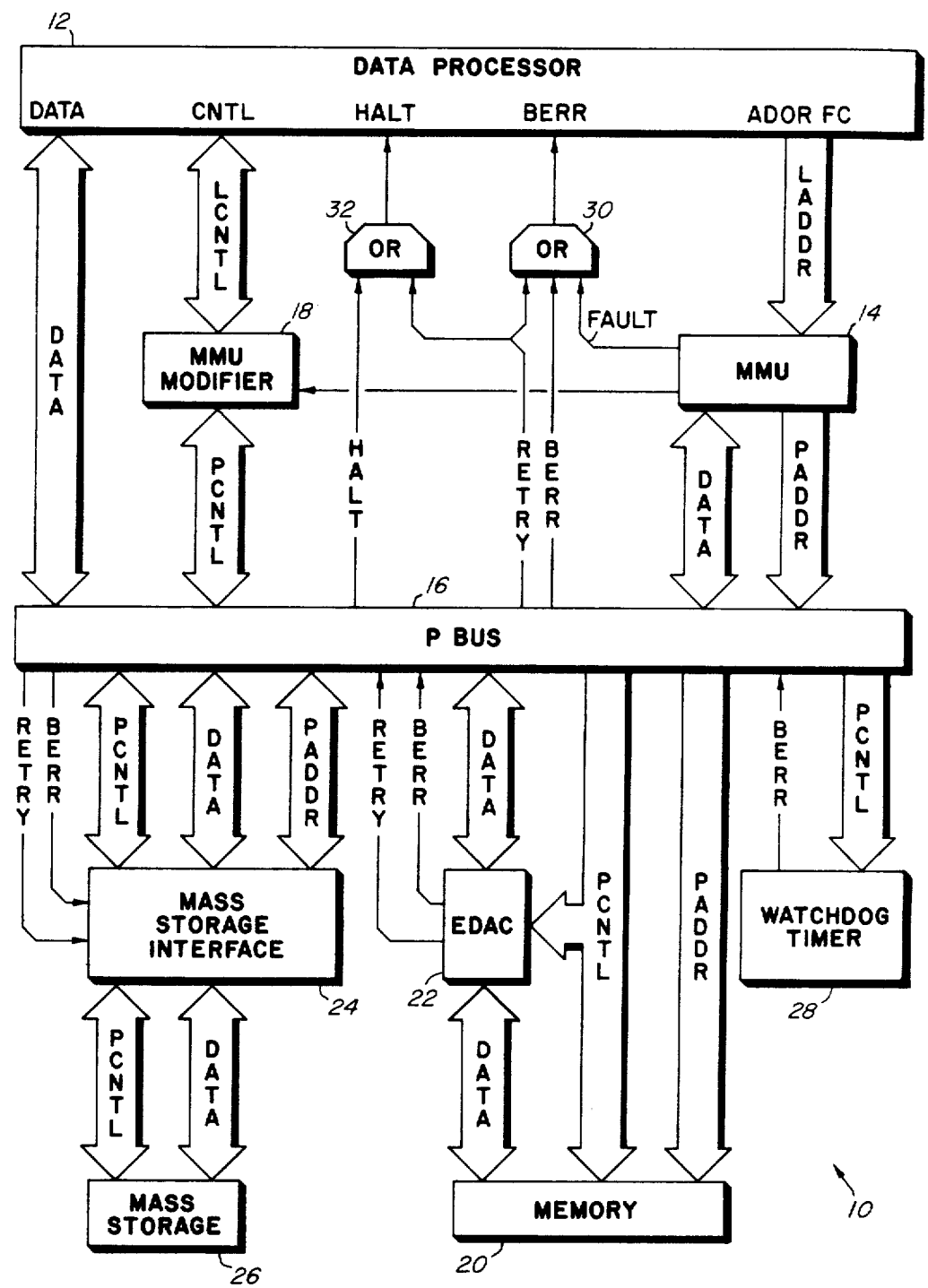
FIG. 1 is a block diagram of a data processing system useful for implementing the invention.

Shown in FIG. 1 is a data processing system 10 wherein logical addresses (LADDR) issued by a data processor (DP) 12 are mapped by a memory management unit (MMU) 14 to a corresponding physical address (PADDR) for output on a physical bus (PBUS) 16. Simultaneously, the various logical access control signals (LCNTL) provided by DP 12 to control the access are converted to appropriately timed physical access control signals (PCNTL) by a modifier unit 18 under the control of MMU 14. DP 12 is an example of a data processor which can implement the present invention relating to boundary checks.

In response to a particular range of physical addresses (PADDR), memory 20 will cooperate with an error detection and correction circuit (EDAC) 22 to exchange date (DATA) with DP 12 in synchronization with the physical access control signals (PCNTL) on PBUS 16. Upon detecting an error in the data, EDAC 22 will either signal a bus error (BERR) or request DP 12 to retry (RETRY) the exchange, depending upon the type of error.

In response to a different physical address, mass storage interface 24 will cooperate with MP 12 to transfer data to or from mass storage 26. If an error occurs during the transfer, interface 24 may signal a bus error (BERR) or, if appropriate, request a retry (RETRY).

In the event that the MMU 14 is unable to map a particular logic address (LADDR) into a corresponding physical address (PADDR), the MMU 14 will signal an access fault (FAULT). As a check for MMU 14, a watchdog timer 28 may be provided to signal a bus error (BERR) if no physical device has responded to a physical address (PADDR) within a suitable time period relative to the physical access control signals (PCNTL).

If, during a data access bus cycle, a RETRY is requested, OR gates 30 and 32 will respectively activate the BERR and HALT inputs of DP 12. In response to the simultaneous activation of both the BERR and HALT inputs thereof during a DP-controlled bus cycle, DP 12 will abort the current bus cycle, and, upon the termination of the RETRY signal, retry the cycle.

If desired, operation of DP 12 may be externally controlled by judicious use of a HALT signal. In response to the activation of only the HALT input thereof via OR gate 32, DP 12 will halt at the end of the current bus cycle, and will resume operation only upon the termination of the HALT signal.

In response to the activation of only the BERR input thereof during a processor-controlled bus cycle, DP 12 will abort the current bus cycle, internally save the contents of the status register, enter the supervisor state, turn off the trace state if on, and generate a bus error vector number. DP 12 will then stack into a supervisor stack area in memory 20 a block of information which reflects the current internal context of the processor, and then use the vector number to branch to an error handling portion of the supervisor program.

Up to this point, the operation of DP 12 is identical to the operation of Motorola's MC68000 microprocessor. However, DP 12 differs from the MC68000 in the amount of information which is stacked in response to the assertion of BERR. The information stacked by the MC68000 consists of: the saved status register, the current contents of the program counter, the contents of the instruction register which is usually the first word of the currently executing instruction, the logical address which was being accessed by the aborted bus cycle, and the characteristics of the aborted bus cycle, i.e. read/write, instruction/data and function code. In addition to the above information, DP 12 is constructed to stack much more information about the internal machine state. If the exception handler is successful in resolving the error, the last instruction thereof will return control of DP 12 to the aborted program. During the execution of this instruction, the additional stacked information is retrieved and loaded into the appropriate portions of DP 12 to restore the state which existed at the time the bus error occurred.

Figure 2:
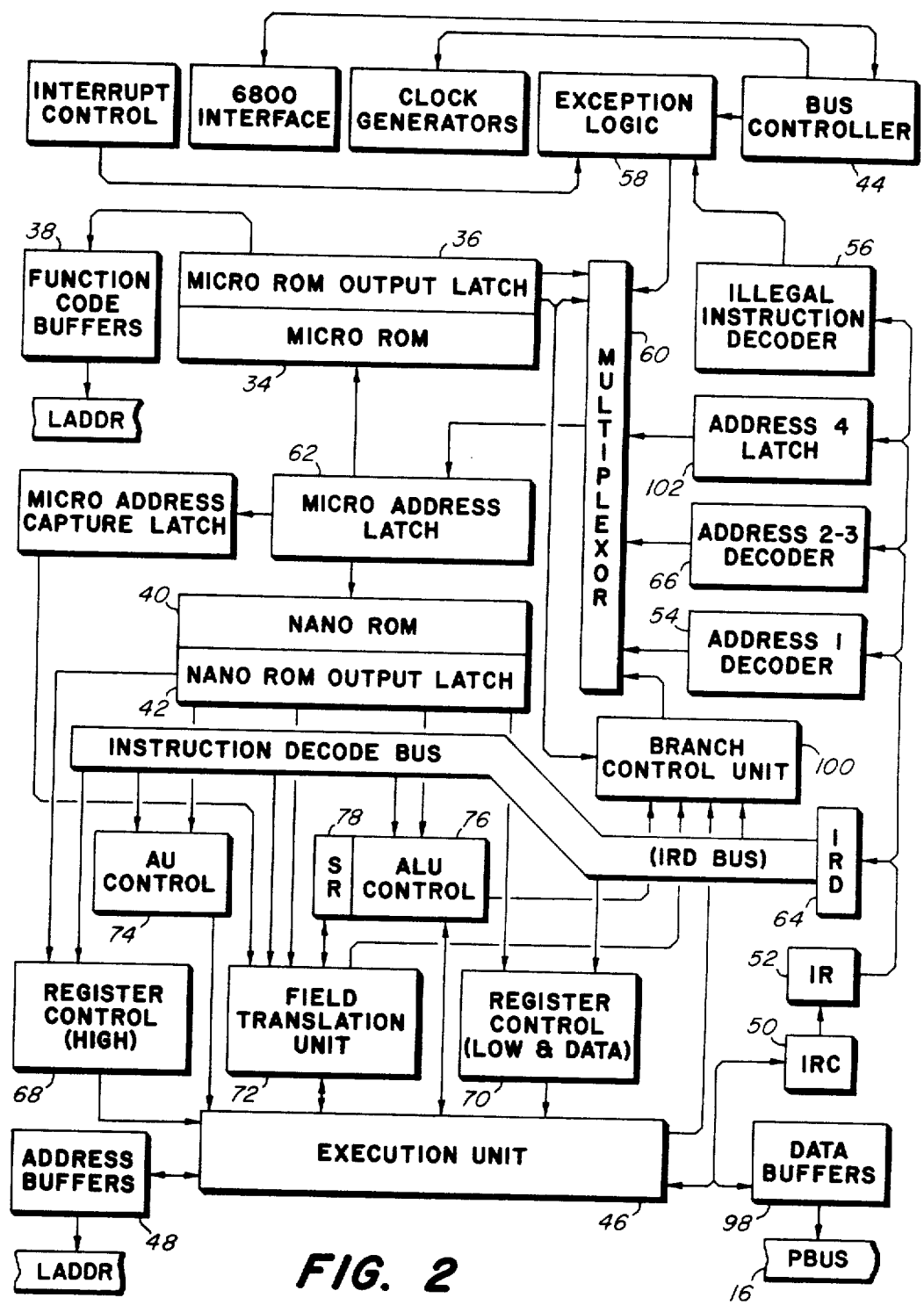
FIG. 2 is a block diagram of the data processor of FIG. 1.

The preferred operation of DP 12 will be described with reference to FIG. 2 which illustrates the internal organization of a microprogrammable embodiment of DP 12. Since the illustrated form of DP 12 is very similar to the Motorola MC68000 microprocessor described in detail in the several U.S. Patents cited hereafter, the common operation aspects will be described rather broadly. Once a general understanding of the internal architecture of DP 12 is established, the discussion will focus on the unique boundary check feature of the present invention.

The DP 12, like the MC68000, is a pipelined, microprogrammed data processor. In a pipelined processor, each instruction is typically fetched during the execution of the preceding instruction, and the interpretation of the fetched instruction usually begins before the end of the preceding instruction. In a microprogrammed data processor, each instruction is typically fetched during the execution of the preceding instruction, and the interpretation of the fetched instruction usually begins before the end of the preceding instruction. In a microprogrammed data processor, each instruction is executed as a sequence of microinstructions which perform small pieces of the operation defined by the instruction. If desired, user instructions may be thought of as macroinstructions to avoid confusion with the microinstructions. In the MC68000 and DP 12, each microinstruction comprises a microword which controls microinstruction sequencing and function code generation, and a corresponding nanoword which controls the actual routing of information between functional units and the actuation of special function units within DP 12.

With this in mind, a typical instruction execution cycle will be described.

At an appropriate time during the execution of each instruction, a prefetch microinstruction will be executed. The microword portion thereof will, upon being loaded from micro ROM 34 into micro ROM output latch 36, enable function code buffers 38 to output a function code (FC) portion of the logical address (LADDR) indicating an instruction cycle. Upon being simultaneously loaded from nano ROM 40 into nano ROM output latch 42, the corresponding nanoword requests bus controller 44 to perform an instruction fetch bus cycle, and instructs execution unit 46 to provide the logical address of the first word of the next instruction to address buffers 48. Upon obtaining control of the PBUS 16, bus controller 44 will enable address buffers 48 to output the address portion of the logical address (LADDR). Shortly thereafter, bus controller 44 will provide appropriate data strobes (some of the LCNTL signals) to activate memory 20. When the memory 20 has provided the requested information, bus controller 44 enables instruction register capture (IRC) 50 to input the first word of the next instruction from PBUS 16. At a later point in the execution of the current instruction, another microinstruction will be executed to transfer the first word of the next instruction from IRC 50 into instruction register (IR) 52, and to load the next word from memory 20 into IRC 50. Depending upon the type of instruction in IR 52, the word in IRC 50 may be immediate data, the address of an operand, or the first word of a subsequent instruction. Details of the instruction set and the microinstruction sequences thereof are set forth fully in U.S. Pat. No. 4,325,121 entitled "Two Level Control Store for Microprogrammed Data Processor" issued Apr. 13, 1982 to Gunter et al, and which is hereby incorporated by reference.

As soon as the first word of the next instruction has been loaded into IR 52, address 1 decoder 54 begins decoding certain control fields in the instruction to determine the micro address of the first microinstruction in the initial microsequence of the particular instruction in IR 52. Simultaneously, illegal instruction decoder 56 will begin examining the format of the instruction in IR 52. If the format is determined to be incorrect, illegal instruction decoder 56 will provide the micro address of the first microinstruction of an illegal instruction microsequence. In response to the format error, exception logic 58 will force multiplexor 60 to substitute the micro address provided by illegal instruction decoder 56 for the micro address provide by address 1 decoder 54. Thus, upon execution of the last microinstruction of the currently executing instruction, the microword portion thereof may enable multiplexor 60 to provide to an appropriate micro address to micro address latch 62, while the nanoword portion thereof enables instruction register decoder (IRD) 64 to load the first word of the next instruction from IR 52. Upon the selected micro address being loaded into micro address latch 62, micro ROM 34 will output a respective microword to micro ROM output latch 36 and nano ROM 40 will output a corresponding nanoword to nano ROM output latch 42.

Generally, a portion of each microword which is loaded into micro ROM output latch 36 specifies the micro address of the next microinstruction to be executed, while another portion determines which of the alternative micro addresses will be selected by multiplexor 60 for input to micro address latch 62. In certain instructions, more than one microsequence must be executed to accomplish the specified operation. These tasks, such as indirect address resolution, are generally specified using additional control fields within the instruction. The micro addresses of the first microinstructions for these additional microsequences are developed by address § decoder 66 using control information in IR 52. In the simpler form of such instructions, the first microsequence will typically perform some preparatory task and then enable multiplexor 60 to select the micro address of the microsequence which will perform the actual operation as developed by the address 3 portion of address § decoder 66. In more complex forms of such instructions, the first microsequence will perform the first preparatory task and then will enable multiplexor 60 to select the micro address of the next preparatory microsequence as developed by the address 2 portion of address § decoder 66. Upon performing this additional preparatory task, the second microsequence then enables multiplexor 60 to select the micro address of the microsequence which will perform the actual operation as developed by the address 3 portion of address § decoder 66. In any event, the last microinstruction in the last microsequence of each instruction will enable multiplexor 60 to select the micro address of the first microinstruction of the next instruction as developed by address 1 decoder 54. In this manner, execution of each instruction will process through an appropriate sequence of microinstructions. A more thorough explanation of the micro address sequence selection mechanism is given in U.S. Pat. No. 4,342,078 entitled "Instruction Register Sequence Decoder for Microprogrammed Data Processor" issued July 27, 1982 to Tredennick et al, and which is hereby incorporated by reference.

In contrast to the microwords, the nanowords which are loaded into nano ROM output latch 42 indirectly control the routing of operands into and, if necessary, between the several registers in the execution unit 46 by exercising control over register control (high) 68 and register control (low and data) 70. In certain circumstances, the nanoword enables field translation unit 72 to extract particular bit fields from the instruction in IRD 64 for input to the execution unit 46. The nanowords also indirectly control effective address calculations and actual operand calculations within the execution unit 46 by exercising control over AU control 74 and ALU control 76. In appropriate circumstances, the nanowords enable ALU control 76 to store into status register (SR) 78 the condition codes which result from each operand calculation by execution unit 46. A more detailed explanation of ALU control 76 is given in U.S. Pat. No. 4,312,034 entitled "ALU and Condition Code Control Unit for Data Processor" issued Jan. 19, 1982 to Gunter, et al, and which is hereby incorporated by reference.

A boundary check system is described herein which can do a boundary check on a signed or unsigned number without requiring a separate signal indicating whether or not the number is signed or unsigned. A boundary check is for the purpose of determining if a number is within two bound numbers. The larger of the two bound numbers is an upper bound and lower of the two boundary numbers is a lower bound. As long as the upper and lower bounds are so chosen, a signed or unsigned boundary check can be performed without being informed as to whether or not the number is signed or unsigned. If the MSB is a zero for both the upper and lower bounds, the boundary check is the same whether the number to be checked is signed or unsigned. If only one bound has an MSB which is one, the boundary location will indicate whether the number to be checked is signed or unsigned. If the boundary number which has an MSB of one is the lower boundary, then it must be a signed check because an MSB of one for an unsigned number is larger than any number with an MSB of zero. Consequently for a number to have an MSB of one but a lower value than a number with an MSB of zero, the number with the MSB of one must be a negative number, and therefore must be a signed number.

Figure 3:
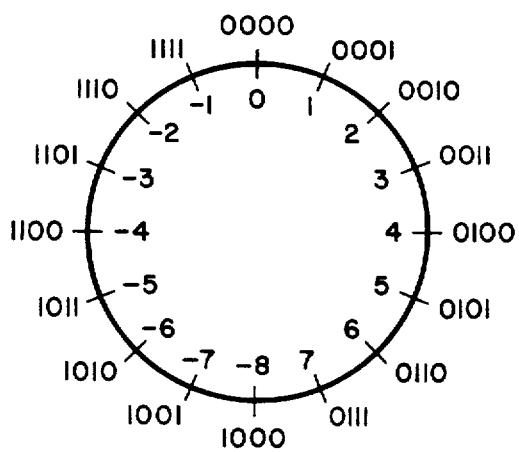
FIG. 3 is a number diagram useful for understanding the invention.

A technique for correlating the positive to the negative is a twos complement relationship. To obtain a negative number of a particular magnitude, the twos complement is taken of the positive number of that magnitude. This representation is commonly used in microcomputer operations because it offers advantages in performing arithmetic functions. In a twos complement representation, an MSB of one followed by all zeros is the most negative number in the system. The MSB is a one for all negative numbers but the numbers become less negative as the logic value increases. All ones is the least negative number of minus one. In a twos complement system then, if both the lower and upper bounds have an MSB of one, the result is the same whether for a signed check or for an unsigned check. FIG. 3 shows a number diagram 300 showing a twos complement implementation for signed numbers. Number diagram 300 is shown for simplicity for four bit binary numbers. The logic value increases in the clockwise direction from the all zeros location. Diagram 300 shows that at the transition from 0111 to 1000, which is a logic value increase of one, there is a numeric transition from the most positive number to the most negative number. Additionally, following this transition point the numeric value increases, by becoming less negative, as the logic value increases.

Figure 4:
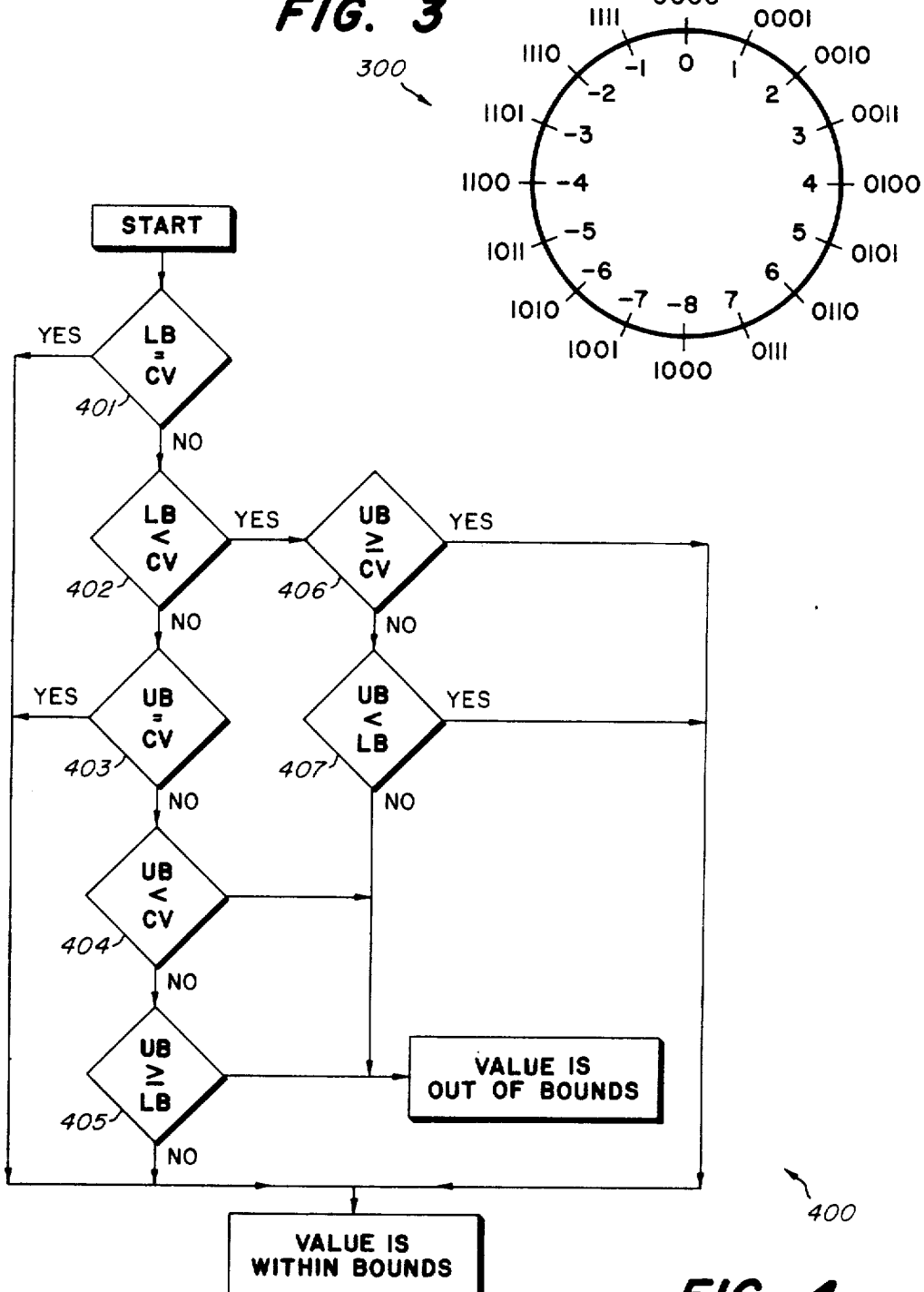
FIG. 4 is a logic flow diagram according to a preferred embodiment of the invention.
Figure 5A:
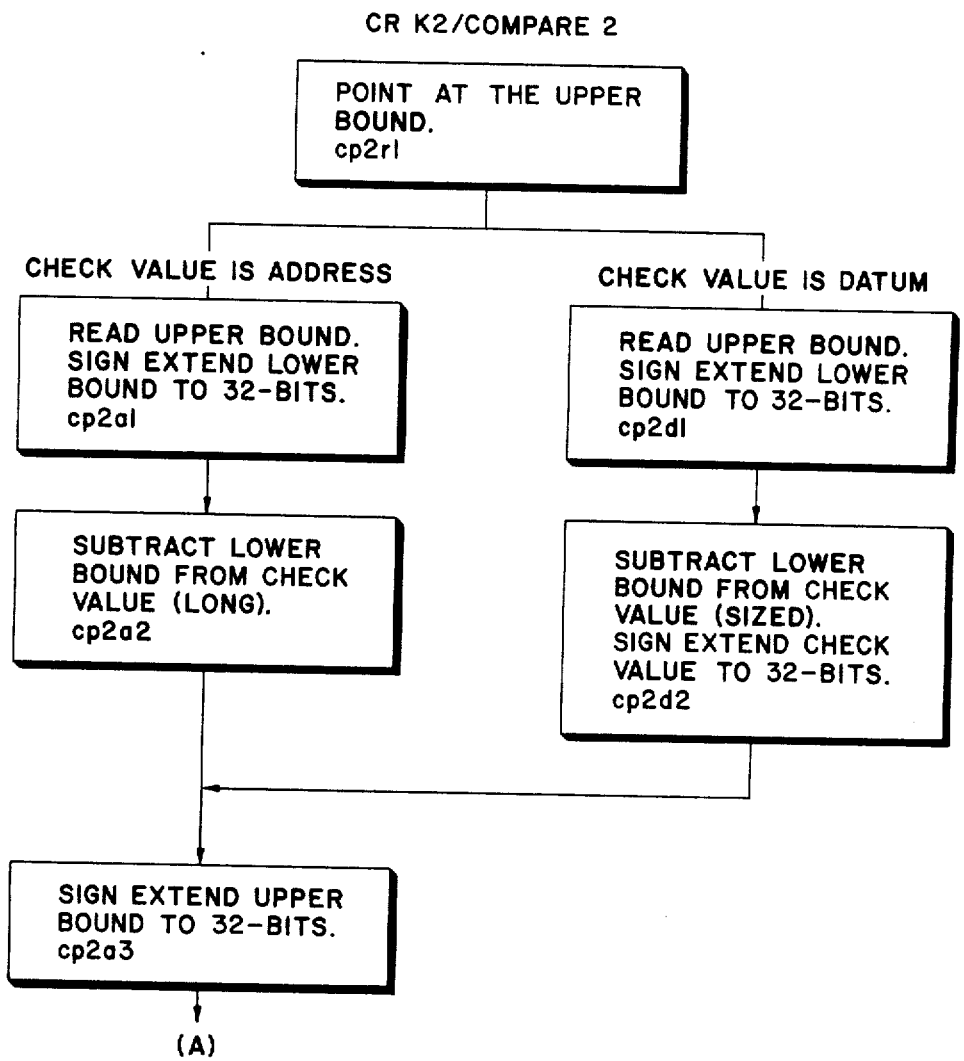
FIGS. 5A, 5B, 5C, 5D and 5E, when configured top to bottom, comprise a micro control flow diagram for implementing the logic flow diagram of FIG. 3.
Figure 5B:
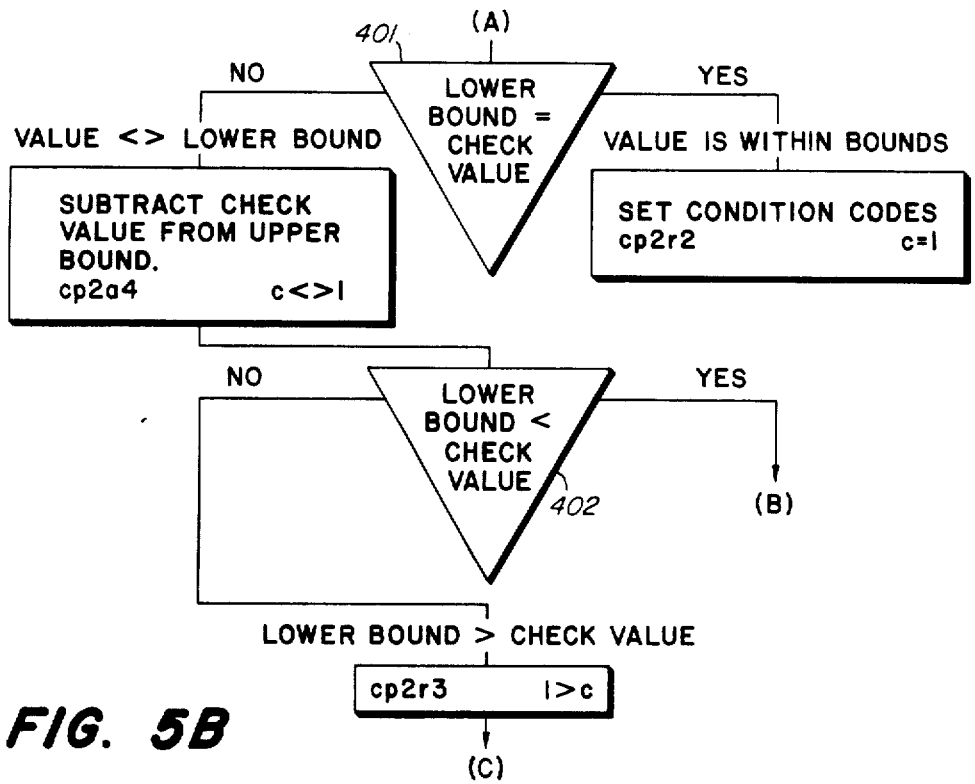
Figure 5C:
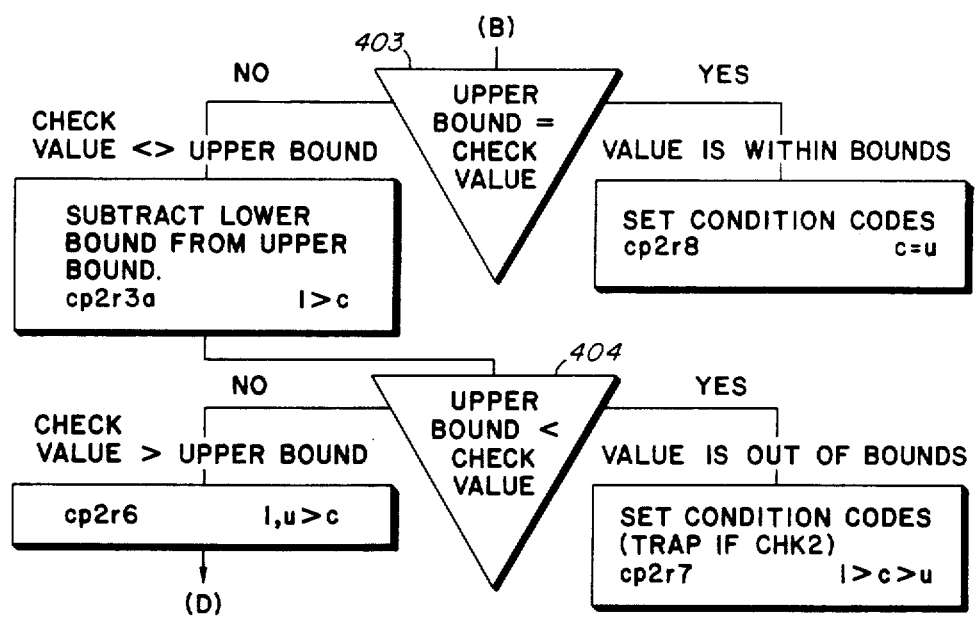
Figure 5D:
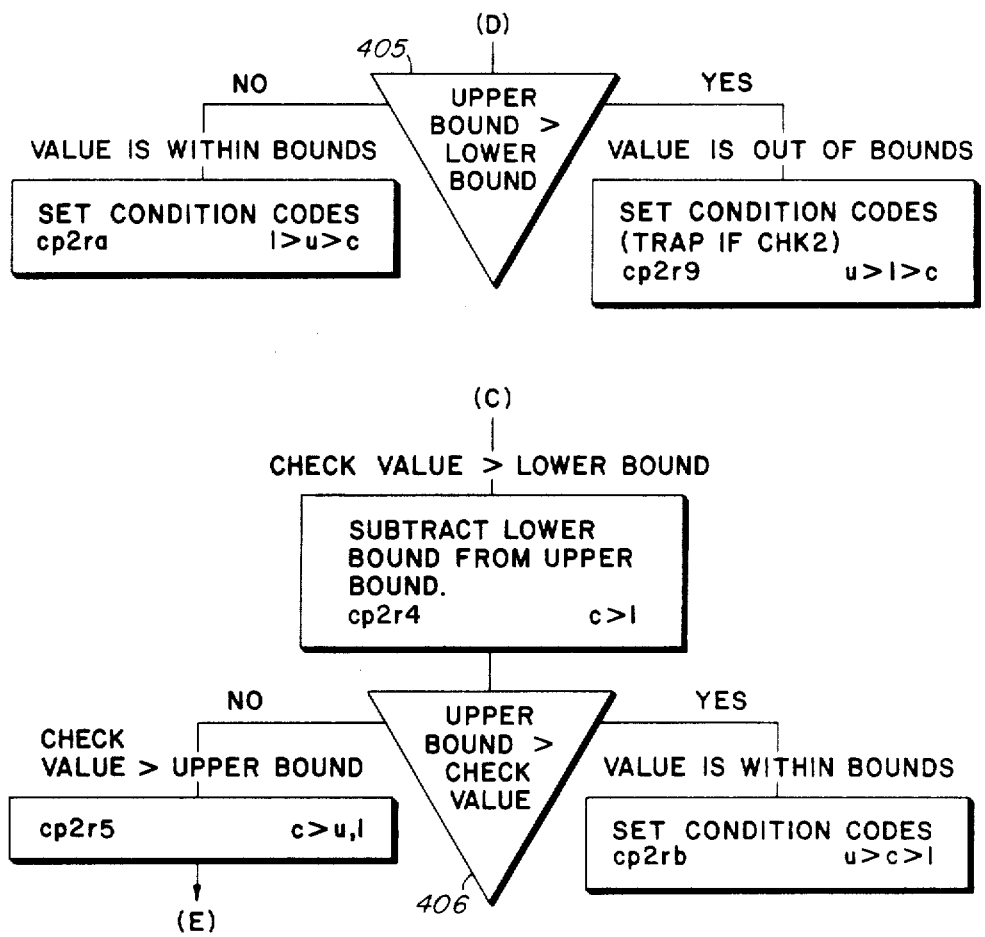
Figure 5E:
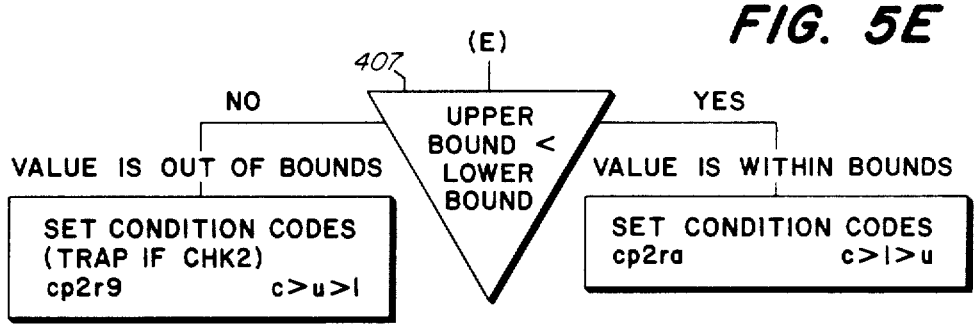

A logic flow diagram 400 shown in FIG. 4 shows in a preferred embodiment how a boundary check can be made in a twos complement system by taking advantage of having upper and lower boundaries which are rationally chosen. The flow diagram is comprised of a branch 401, a branch 402, a branch 403, a branch 404, a branch 405, a branch 406, and a branch 407. All of the values are compared on a numeric basis for the logic flow shown. In a microcomputer system it is sometimes inconvenient to check "greater than" or "less than" while simultaneously checking "equal to". In the approach described "greater than or equal to" can be achieved in a single microinstruction but "less than" requires an additional microinstruction to obtain "equals to". At branch 401 a determination is made as to whether or not the lower bound is equal to a check value. If the answer is yes, then the value is within bounds. If the answer is no, then at branch 402 a determination is made as to whether or not the lower bound is less than the check value. If the answer is yes, a determination at branch 406 is made as to whether or not the upper bound is greater than or equal to the check value. If the answer is yes, then the check value is in bounds. Upon the "yes" determination at branch 406, it is known that the check value is greater than the lower bound and less than or equal to the upper bound. Consequently the check value, must be in bounds whether it is signed or unsigned. Even if, however, the check value is greater than the upper bound numerically, it still may be less than the upper bound logically. If the determination at branch 406 is no, then a determination at branch 407 is made as to whether or not the upper bound is less than the lower bound. If the upper bound is greater than the lower bound, the check value is greater than the lower, but the check value is also greater than the upper bound, then the check value is out of bounds whether signed or unsigned. If, however, the upper bound is less than the lower bound, the check value is an unsigned number, the upper bound must be a negative number, and the lower bound must be a positive number. The check value, in order to be greater than the lower bound, must also be a positive number. Consequently the check value is logically greater than the lower bound and logically less than the upper bound so that the check value is in bounds.

If at branch 402 the answer is no, then at branch 403 a determination is made as to whether or not the check value equals the upper bound. If the answer is yes, then the check value is in bounds. If the answer is no, then at branch 404 a determination is made as to whether or not the upper bound is less than the check value. If the answer is yes, the check value is out of bounds. A "yes" at branch 404 means that the check value is less than the lower bound but greater than the upper bound. If both the lower bound and check value are positive, then the check value must be out of bounds in view of the check value being less than the lower bound. If the check value is negative, the check value could be logically in bounds if the lower bound is positive. If the upper bound is less than (more negative) the check value, however, as a "yes" at branch 404 indicates, the check value cannot be in bounds. If the answer at branch 404 is no, then a determination at branch 405 is made as to whether or not the upper bound is greater than the lower bound. If the answer is yes, the check value is out of bounds. But if the answer is no, the check value is within bounds. A "no" at branch 405 covers the case in which the lower bound is positive, the check value is numerically negative, and the upper bound is also numerically negative but not as negative as the check value, in which case the check value is in bounds but as an unsigned number.

Shown in FIGS. 5A, 5B, 5C, 5D and 5E, configured top to bottom, is a micro-control flow diagram which illustrates a preferred implemenation of the logic flow diagram shown in FIG. 4 in a micro-programmed data processor such as the MC68000 referred to above. In the micro control flow, subtraction microinstructions are included for performing the calculations needed for branches 401-407. Each of the branches 401-407 of FIG. 4 are shown as corresponding branches in FIGS. 5A-5D. Note that the micro-control has been constructed to process operands having up to 32 bits. In FIGS. 5A-5D binary numbers of 32 bits are referred to as long words, of 16 bits are referred to as words, and of 8 bits are referred to as bytes. Thus, in the illustrated form, the upper and lower bounds can be bytes, words, or long words. Before the boundary check is done on byte or word operands, however, a sign extension is done to achieve 32 bits. A sign extension is achieved by making all of the new bits the same as the MSB of the byte or word being extended. Consequently, all of the actual boundary checks are done in long word form for simplicity. The implementation shown in FIGS. 5A-5D can be achieved in a MC68000 as disclosed in the U.S. Patents previously incorporated by reference.

We claim:

1. In a data processor having means for storing an upper bound and a lower bound, a method for determining if a check value, which may be signed or unsigned, is within the upper and lower bounds, comprising the steps of:
   providing a within-bounds signal if any of the following conditions are met:
      the lower bound equals the check value; or
      the lower bound is less than the check value, and the upper bound is greater than or equal to the check value; or
      the lower bound is less than the check value, the upper bound is not greater than or equal to the check value, and the upper bound is less than the lower bound; or
      the upper bound is equal to the check value; or
      the lower bound is not less than the check value, the upper bound is not less than the check value, and the upper bound is not greater than or equal to the lower bound; and
   providing an out-of-bounds signal if none of the conditions for providing the within bounds signal are met;
   whereby the check value is in bounds if the in-bounds signal is provided and is out of bounds if the out-of-bounds signal is provided.

2. In a data processor having means for storing an upper bound and a lower bound, a method for determining if a check value, which may be signed or unsigned, is within the upper and lower bounds, comprising the steps of:
   determining if the lower bound equals the check value;
   determining if the lower bound is less than the check value;
   determining if the upper bound is less than the lower bound;
   determining if the upper bound is equal to the check value;
   determining if the upper bound is greater than or equal to the check value;
   providing a within-bounds signal if any of the following conditions are met:
      the lower bound is determined to be equal to the check value; or
      the lower bound is determined to be less than the check value, and the upper bound is determined to be greater than or equal to the check value; or
      the lower bound is determined to be less than the check value, the upper bound is determined to be not greater than or equal to the check value, and the upper bound is determined to be less than the lower bound; or
      the upper bound is determined to be equal to the check value; or
      the lower bound is determined to be not less than the check value, the upper bound is determined to be not less than the check value, and the upper bound is determined to be not greater than or equal to the lower bound; and
   providing an out-of-bounds signal if none of the conditions for providing a within-bounds signal are met;
   whereby the check value is in bounds if the in-bounds signal is provided and is out of bounds if the out-of-bounds signal is provided.

3. In a microcomputer having means for storing an upper bound and a lower bound, a method for determining if a check value, which may be signed or unsigned number, is within the upper and lower bounds, comprising the steps of:

- providing a within-bounds signal if the lower bound equals the check value;
- determining whether or not the lower bound is less than the check value when the lower bound has been determined to be not equal to the check value;
- determining whether or not the upper bound is greater than or equal to the check value when the lower bound has been determined to be less than the check value;
- providing the within-bounds signal when the lower bound has been determined to be less than the check value and the upper bound has been determined to be greater than or equal to the check value;
- determining whether or not the upper bound is less than the lower bound when the lower bound has been determined to be less than the check value and the upper bound has been determined to be not greater than or equal to the check value;
- providing the within-in bounds signal when the lower bound has been determined to be less than the check value, the upper bound has been determined to be not greater than or equal to the check value, and the upper bound has been determined to be less than the lower bound;
- providing an out-of-bounds signal when the lower bound has been determined to be less than the check value, the upper bound has been determined to be not greater than or equal to the check value, and the upper bound has been determined to be not less than the lower bound;
- determining whether or not the upper bound is equal to the check value when the lower bound has been determined to be not less than the check value, and the check value has been determined to be not equal to the lower bound;
- providing the within-bounds signal when the upper bound has been determined to be equal to the check value;
- determining whether or not the upper bound is less than the check value when the lower bound has been determined to be not less than the check value, the upper bound has been determined to be not equal to the check value, and the check value has been determined to be not equal to the lower bound;
- providing the out-of-bounds signal when the lower bound has been determined to be not equal to the check value, the upper bound has been determined to be less than the lower bound, the lower bound has been determined to be not less than the check value, and the upper bound has been determined to be not equal to the check value;
- determining whether or not the upper bound is greater than or equal to the lower bound when the lower bound has been determined to be not equal to the check value, the lower bound has been determined to be not less than the check value, the upper bound has been determined to be not equal to the check value, and the upper bound has been determined to be not less than the check value;
- providing the out-of-bounds signal when the upper bound is determined to be greater than or equal to the lower bound, the lower bound has been determined to be not equal to the check value, the lower bound has been determined to be not less than the check value, and the upper bound has been determined to be not less than the check value; and
- providing the within-bounds signal when the lower bound is determined to be not less than the check value, the upper bound is determined to be not less than the check value, and the upper bound is determined to be not greater than or equal to the lower bound.

4. In a data processor having means for storing an upper bound and a lower bound, a circuit for determining if a check value, which may be signed or unsigned, is within the upper and lower bounds, comprising:

- means for providing a within-bounds signal if any of the following conditions are met:
  - the lower bound equals the check value; or
  - the lower bound is less than the check value, and the upper bound is greater than or equal to the check value; or
  - the lower bound is less than the check value, the upper bound is not greater than or equal to the check value, and the upper bound is less than the lower bound; or
  - the upper bound is equal to the check value; or
  - the lower bound is not less than the check value, the upper bound is not less than the check value, and the upper bound is not greater than or equal to the lower bound; and
- means for providing an out-of-bounds signal if none of the conditions for providing the within-bounds signal are met;
- whereby the check value is in bounds if the within-bounds signal is provided and is out of bounds if the out-of-bounds signal is provided.

5. In a data processor having means for storing an upper bound and a lower bound, a circuit for determining if a check value, which may be signed or unsigned, is within the upper and lower bounds, comprising:

- first means for determining if the lower bound equals the check value;
- second means for determining if the lower bound is less than the check value;
- third means for determining if the upper bound is less than the lower bound;
- fourth means for determining if the upper bound is equal to the check value;
- fifth means for determining if the upper bound is greater than or equal to the check value;
- sixth means for providing a within-bounds signal if any of the following conditions are met:
  - the first means determines that the lower bound is equal to the check value; or
  - the second means determines that the lower bound is less than the check value, and the fifth means determines that the upper bound is greater than or equal to the check value; or
  - the second means determines that the lower bound is less than the check value, the fifth means determines that the upper bound is not greater than or equal to the check value, and the third means determines that the upper bound is less than the lower bound; or
  - the fourth means determines that the upper bound is equal to the check value; or
  - the second means determines that the lower bound is not less than the check value, the fifth means determines that the upper bound is not less than the check value, and the third means determines that the upper bound is not greater than or equal to the lower bound; and seventh means for providing an out-of-bounds signal if none of the conditions for providing a within-bounds signal are met;

whereby the check value is in bounds if the in-bounds signal is provided and is out of bounds if the out-of-bounds signal is provided.

* * * * *